(12) United States Patent
Hensel

(10) Patent No.: US 9,347,545 B2
(45) Date of Patent: May 24, 2016

(54) TRANSMISSION VENT CAP

(75) Inventor: Barry Hensel, Canton, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

(21) Appl. No.: 13/547,843

(22) Filed: Jul. 12, 2012

(65) Prior Publication Data

US 2014/0014662 A1    Jan. 16, 2014

(51) Int. Cl.
| | | |
|---|---|---|
| *B65D 51/16* | (2006.01) | |
| *F16H 57/027* | (2012.01) | |
| *F16L 27/08* | (2006.01) | |
| *F16L 37/53* | (2006.01) | |
| *F16L 37/098* | (2006.01) | |
| *F16L 37/133* | (2006.01) | |

(52) U.S. Cl.
 CPC .............. *F16H 57/027* (2013.01); *F16L 27/08* (2013.01); *F16L 37/53* (2013.01); *B65D 51/1605* (2013.01); *F16L 37/098* (2013.01); *F16L 37/133* (2013.01)

(58) Field of Classification Search
 CPC ... F16L 37/0985; F16L 27/0845; F16L 27/08; F16L 41/08; F16L 37/098; F16L 24/04; F16L 24/06; F16L 23/00; F16L 23/06; F16L 23/08; F16L 23/162; F16L 27/0861; F16L 37/53; F16L 37/113; F16L 37/12–37/20; F16L 37/122; F16L 37/123; F16L 37/133; B65D 51/16; B65D 51/1605; B63J 2/10; B60P 3/2255; B60K 15/035; F16H 57/027
 USPC ........... 220/367.1, 201, DIG. 27, 32, 33, 745, 220/746, 303, 360, 373, 374, 913; 55/DIG. 19, 385.4; D23/262, 264, 263, D23/259; 285/205, 184
 See application file for complete search history.

(56) References Cited

U.S. PATENT DOCUMENTS

| | | | | |
|---|---|---|---|---|
| 617,761 | A | * | 1/1899 | Musgreave ...................... 285/68 |
| 792,417 | A | * | 6/1905 | Houser ............................ 285/70 |
| 850,410 | A | * | 4/1907 | Weatherhead ................. 285/196 |
| 924,587 | A | * | 6/1909 | Sharp .............................. 55/392 |
| 1,461,958 | A | * | 7/1923 | Arnold ........................... 285/305 |
| 3,034,521 | A | * | 5/1962 | Greenfield .................. 134/102.1 |
| D254,505 | S | * | 3/1980 | Parsons et al. ............... D23/262 |
| 4,570,976 | A | * | 2/1986 | Othold et al. ...................... 285/4 |
| 5,509,949 | A | * | 4/1996 | Gluys et al. .................. 55/385.3 |
| 5,586,791 | A | * | 12/1996 | Kirchner et al. .............. 285/179 |
| 5,692,783 | A | * | 12/1997 | Watanabe et al. ............... 285/61 |
| 5,724,864 | A | * | 3/1998 | Rodgers et al. .............. 74/606 R |
| 5,893,589 | A | * | 4/1999 | Bleitz et al. ................... 285/184 |
| 6,447,565 | B1 | * | 9/2002 | Raszkowski et al. ......... 55/385.4 |
| 6,783,022 | B2 | * | 8/2004 | Essing ........................... 220/562 |
| 6,920,893 | B2 | * | 7/2005 | Rokkjaer ....................... 137/322 |

(Continued)

*Primary Examiner* — Anthony Stashick
*Assistant Examiner* — Mollie Llewellyn

(57) ABSTRACT

A vent cap for a transmission is provided. The vent cap includes an insertion part for attaching the vent cap to the transmission. The insertion part has portions forming a first channel through the insertion part. The vent cap also has a vent part for attaching the vent cap to a hose. The vent part is attached to the insertion part. The vent part may have a vent base and a hose attachment portion extending from the vent base, wherein the hose attachment portion defines a second channel therethrough. The second channel is in communication with the first channel. The second channel may be orientated substantially perpendicular to the first channel. The insertion part may have at least one insertion attachment feature that mates with at least one vent attachment features of the vent part.

13 Claims, 4 Drawing Sheets

(56) References Cited

U.S. PATENT DOCUMENTS

| | | | |
|---|---|---|---|
| 6,966,330 B2 * | 11/2005 | Frohwein | 137/202 |
| 7,481,463 B2 * | 1/2009 | Ishida et al. | 285/305 |
| 7,878,553 B2 * | 2/2011 | Wicks et al. | 285/319 |
| D674,058 S * | 1/2013 | Yu | D23/262 |
| 2003/0010151 A1 * | 1/2003 | Johnson et al. | 74/606 R |
| 2003/0093981 A1 * | 5/2003 | Johannesson | 55/385.4 |
| 2004/0124567 A1 * | 7/2004 | Stangier | 264/523 |
| 2006/0099839 A1 * | 5/2006 | Ishida | F16L 41/007 439/157 |
| 2009/0200796 A1 * | 8/2009 | Lai | 285/317 |

* cited by examiner

TRANSMISSION VENT CAP

FIELD

The present disclosure relates to devices for venting automatic transmissions, and more specifically, to a vent cap for a transmission assembly.

BACKGROUND

The statements in this section merely provide background information related to the present disclosure and may or may not constitute prior art.

A transmission, particularly a hydraulically controlled planetary gear automatic transmission for a motor vehicle, operates at temperatures well above ambient, often at 130° C. (265° F.) or higher. Because the transmission may begin operation at ambient temperatures as low as −35° C. (−30° F.) or lower, the air within the transmission will undergo significant expansion. Conversely, when the transmission becomes inactive, the transmission's nominal temperature may drop relatively rapidly and the air within the transmission will contract. In order to accommodate these changes and to avoid pressurization or a partial vacuum within the transmission, a transmission is equipped with a breather system which allows exhaust and ingestion of air. Under extreme conditions, fluid could also be expelled from the transmission.

Some transmission breather systems include a vent cap and a hose extending from the vent cap. The vent cap may be installed onto a top side of the transmission case, and the hose may then extend upwardly from the vent cap. Such a configuration allows installing, or screwing on, of the vent cap in any orientation. This configuration requires space for the hose to be located above the vent cap and transmission. Reduced packaging needs and smaller components, however, are a constant goal in transmission design.

SUMMARY

The present disclosure provides a vent cap for a transmission assembly that allows a hose to be attached to the vent cap assembly even in a tight packaging space.

In one aspect, which may be combined with or separate from the other aspects described herein, a vent cap for a transmission is provided that includes an insertion part and a vent part. The insertion part is provided for attaching the vent cap to the transmission. The insertion part has portions forming a first channel through the insertion part. The vent part is provided for attaching the vent cap to a hose. The vent part is attached to the insertion part. The vent part has a vent base and a hose attachment portion extending from the vent base. The hose attachment portion defines a second channel therethrough. The second channel is in communication with the first channel, and the second channel is orientated substantially perpendicular to the first channel.

In another aspect, which may be combined with or separate from the other aspects described herein, a vent cap for a transmission is provided which also has an insertion part for attaching the vent cap to the transmission and a vent part for attaching the vent cap to a hose. The insertion part has portions forming a first channel through the insertion part. The insertion part has one or more first attachment features. The vent part is attached to the insertion part. The vent part defines a second channel therethrough. The second channel is in communication with the first channel. The vent part has at least one second attachment feature. The first attachment feature (or features) mate with the second attachment feature (or features).

In yet another variation, which may combined with or separate from the other variations described herein, a vent part is provided for attachment to an insertion part of a vent cap of a transmission. The vent part includes a base portion and a hose attachment portion extending from the base portion. The vent part defines a channel through the base portion and the hose attachment portion. The channel has a first portion extending to a first opening in the base portion and a second portion extending to a second opening in the hose attachment portion. The first portion is orientated substantially perpendicular to the second portion.

In still another variation, which may be combined with or separate from the other variations described herein, an insertion part is provided for attachment to a vent part of a transmission vent cap and for attachment to a transmission case of a transmission. The insertion part includes a base portion and a projection extending from the base portion. The vent part forms a channel through the base portion and the projection. The insertion part has a plurality of attachment features disposed on the base portion. Each attachment feature is either a tab or a slot. The attachment features are configured to mate with corresponding vent attachment features disposed on the vent part.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
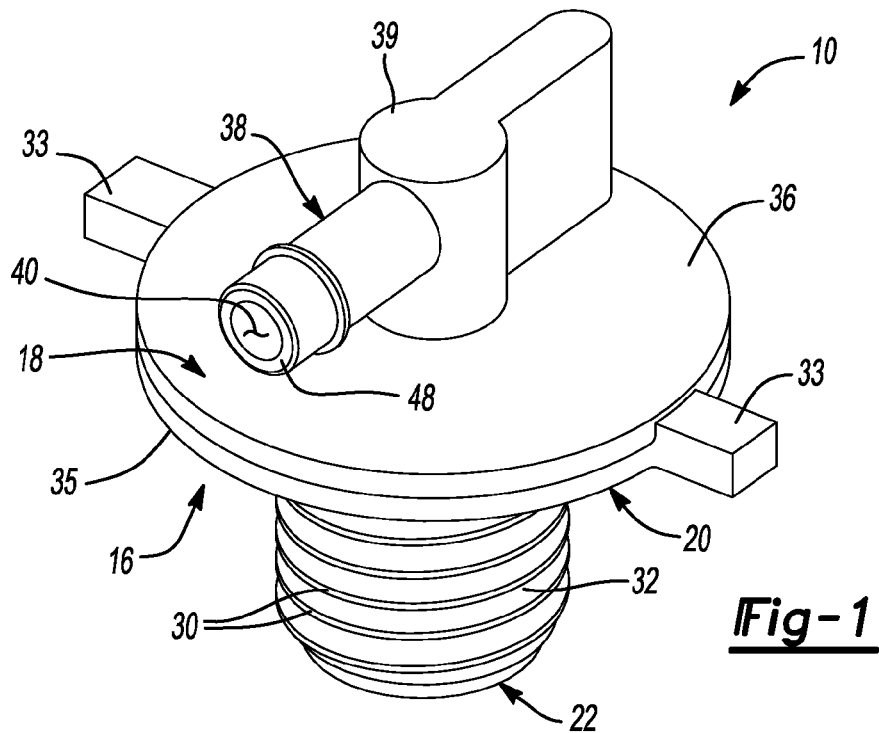
FIG. 1 is a perspective view of a vent cap according to the principles of the present invention.
Figure 2:
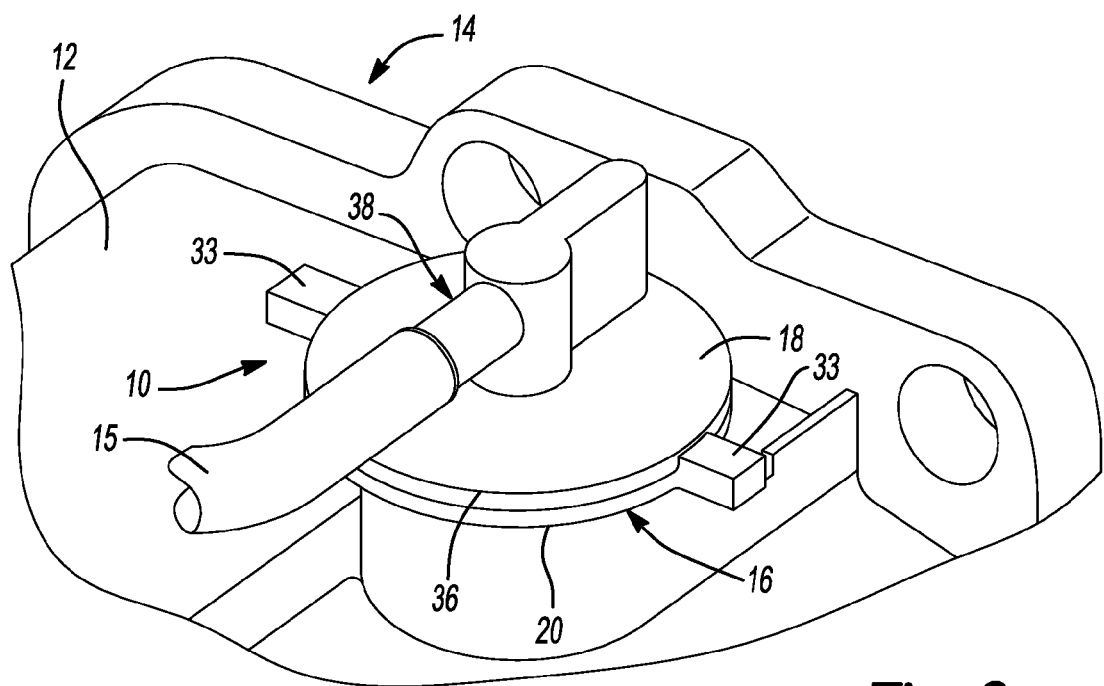
FIG. 2 is a perspective view of the vent cap of FIG. 1 attached to a transmission case, in accordance with the principles of the present invention.
Figure 3:
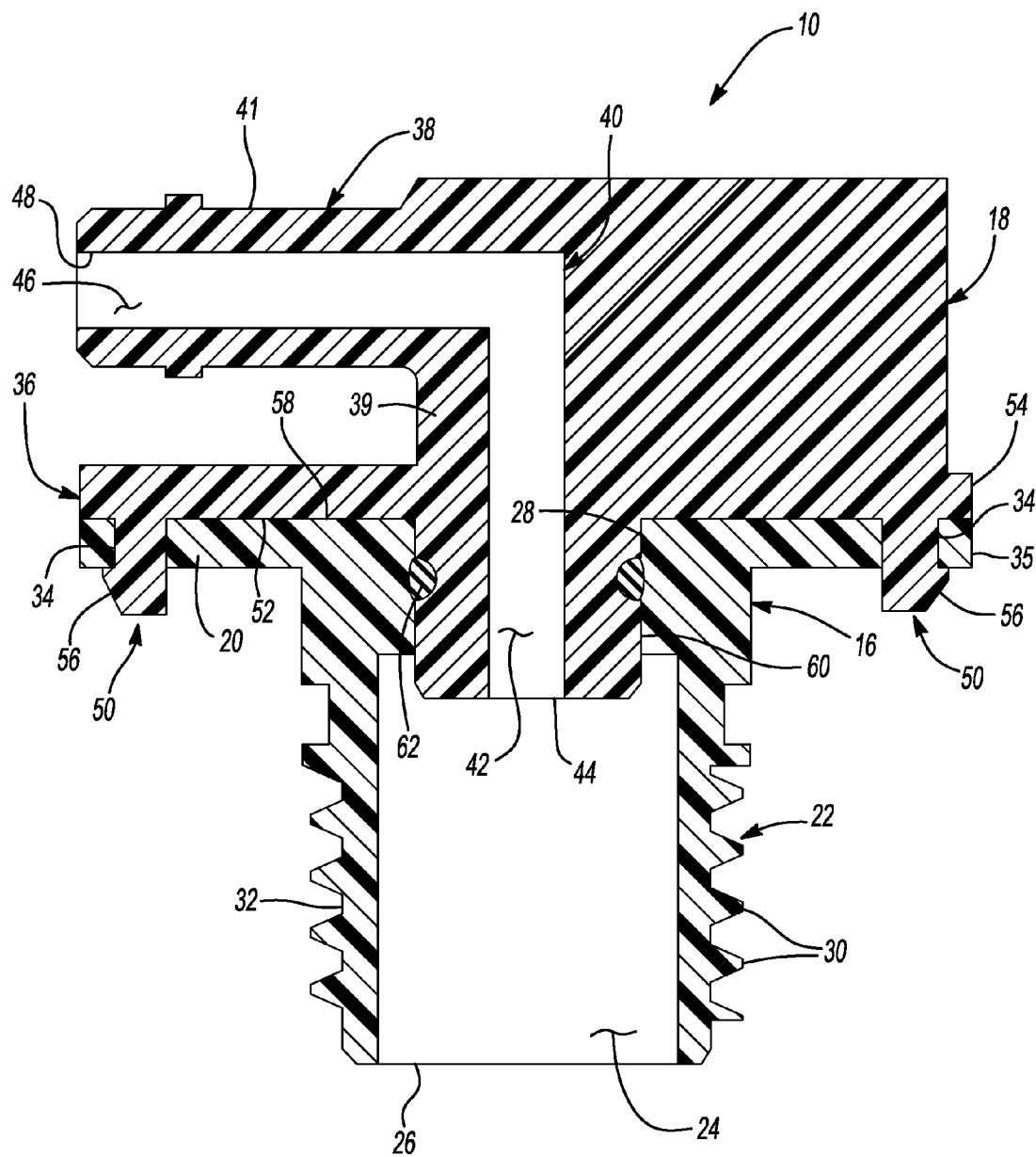
FIG. 3 is a side cross-sectional view of the vent cap of FIGS. 1-2, according to the principles of the present invention.
Figure 4:
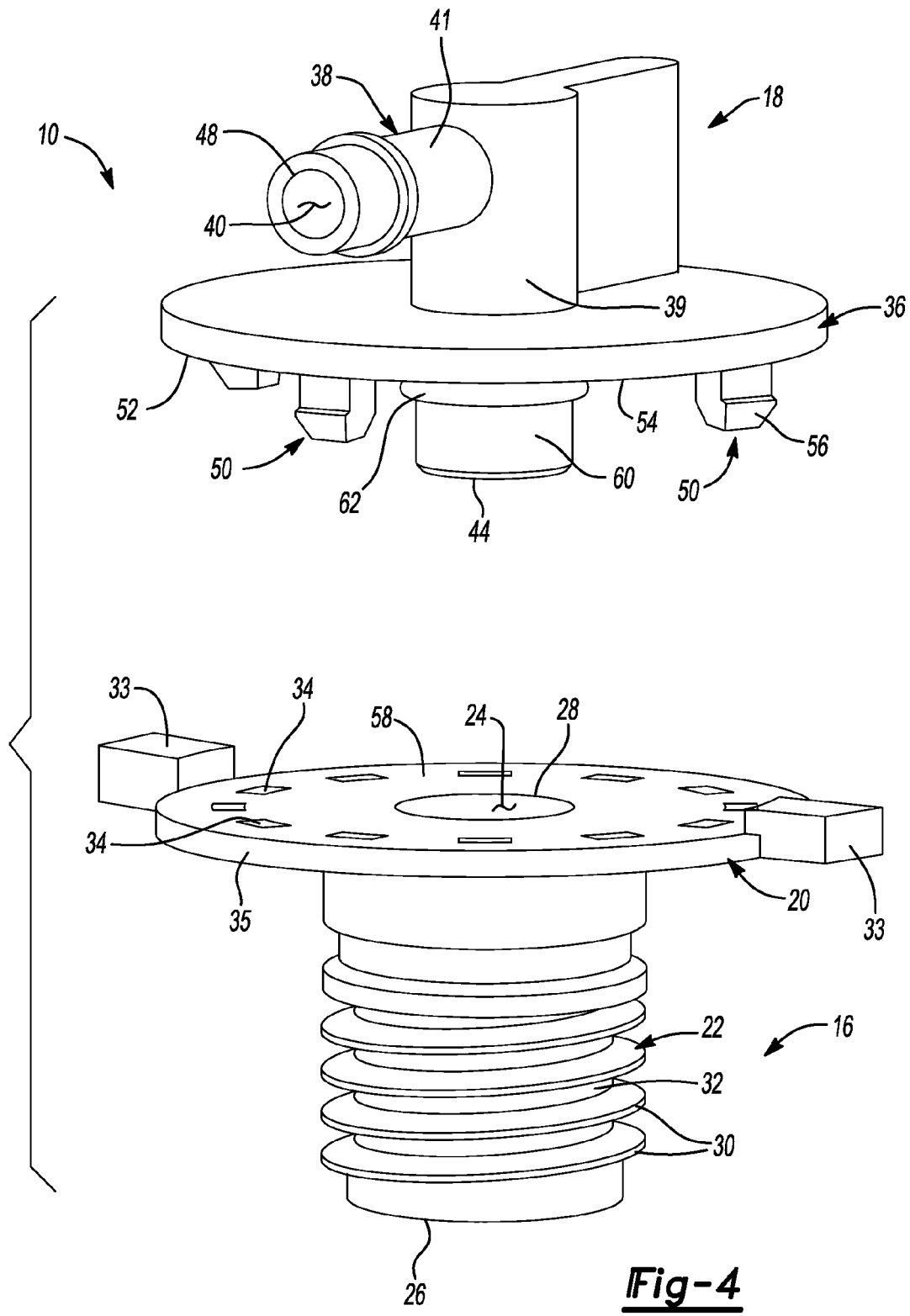
FIG. 4 is an exploded perspective view of the vent cap of FIGS. 1-3, in accordance with the principles of the present invention.
Figure 5A:
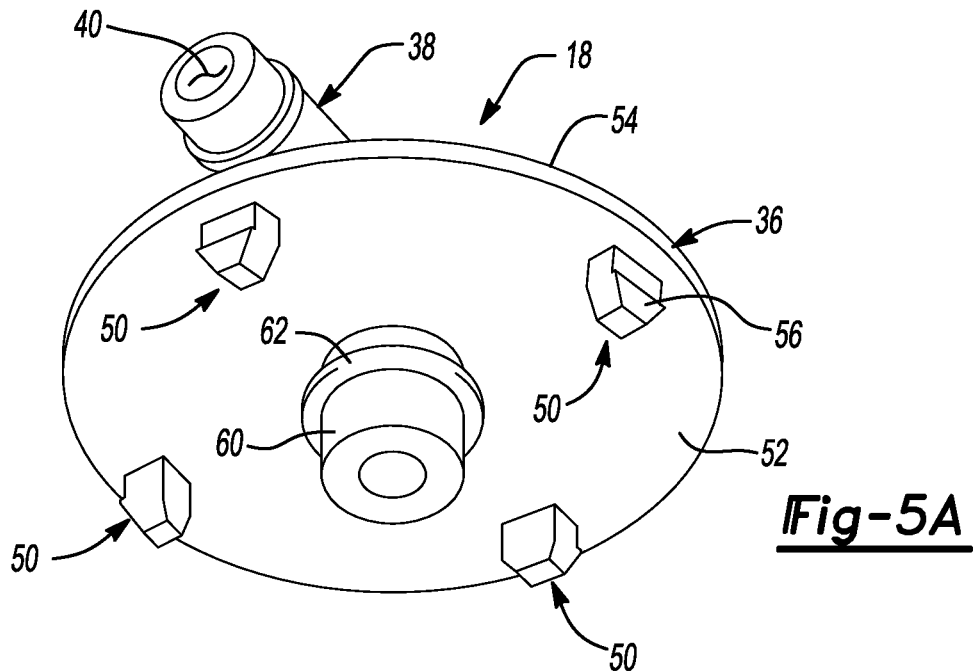
FIG. 5A is a perspective view of the vent part of the vent cap of FIGS. 1-4, according to the principles of the present invention.
Figure 5B:
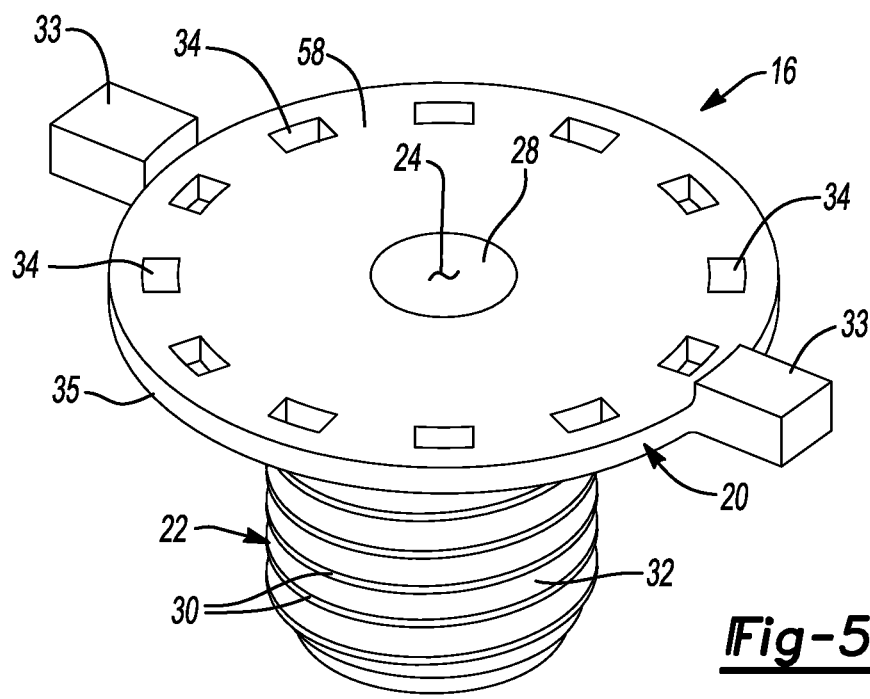
FIG. 5B is a perspective view of the insertion part of the vent cap of FIGS. 1-4, in accordance with the principles of the present invention.

With reference to the figures, a vent cap for use with a transmission is illustrated and generally designated at 10. The vent cap 10 may be attached to a top side 12 of a transmission case 14, by way of example (see FIG. 2). The vent cap 10, along with a hose 15 attached thereto, allows the transmission to "breathe," for example, to allow air to move into and out of the transmission case 14 through the vent cap 10, and specifically, through the hose 15 attached to the vent cap 10.

The vent cap 10 has two separate pieces: the insertion part 16 and the vent part 18. However, in other embodiments, a single unitarily formed vent cap 10 could be used. Thus, in the illustrated embodiment, the vent cap 10 includes an insertion part 16 for attaching the vent cap 10 to the transmission and a vent part 18 for attaching the vent cap 10 to a hose 15. Generally, air is vented into and out of the transmission case 14 through the hose 15, and under extreme conditions, liquid could also be expelled through the hose 15.

The insertion part 16 has an insertion base portion 20, which has a generally flat, circular shape. A projection 22 extends from the insertion base 20. A channel 24 is formed through the projection 22 and the insertion base 20. The channel 24 extends from an opening 26 formed at a distal end of the projection 22, through the projection 22, and to an opening 28 formed in the insertion base 20. The projection 22 has a generally circular cylindrical shape and has threads 30 on its outer surface 32 to attach the insertion part 16 to the transmission case 14. The insertion part 16 may also have tabs 33 extending from its outer circumference to aid an installer in attaching the vent cap 10 to a transmission.

The insertion base 20 has at least one attachment feature in the form of a slot 34 disposed on the insertion base 20. In the illustrated embodiment, a plurality of attachment features, and in this case twelve slots 34, are disposed on the insertion base 20. The slots 34 are formed in the insertion base 20. The slots 34 are used to attach the vent part 18 to the insertion part 16, which will be described in further detail below. The slots 34 are equidistantly disposed in a circular pattern near and around the outer edge 35 of the insertion base 20. Thus, each slot 34 is disposed 30° from each other slot 34 around the insertion base 20.

The vent part 18 has a vent base portion 36, which has a generally flat, circular shape. In some embodiments, the vent base 36 has substantially the same diameter as the insertion base 20. A hose attachment portion 38 extends from the vent base 36. The vent part 18 defines a channel 40 therethrough. The channel 40 has a first portion 42 that extends through the vent base 36 and through an opening 44, and a second portion 46 that extends through an opening 48 of the hose attachment portion 38. The first portion 42 of the channel 40 is oriented substantially perpendicular to the second portion 46 of the channel 40. When the vent cap 10 is installed, the hose 15 will be attached to the hose attachment portion 38 over the opening 48.

The hose attachment portion 38 has a generally circular, cylindrical shaped first portion 39 that is connected to a generally circular, cylindrical shaped second portion 41. The first portion 39 and the second portion 41 are disposed substantially perpendicular to each other. The first portion 42 of the channel 40 is formed in the first portion 39 of the hose attachment portion 38, and the second portion 46 of the channel 40 is formed in the second portion 41 of the hose attachment portion 38.

The vent part 18 has one or more second attachment features, such as tabs 50, extending from the vent base 36. In the illustrated embodiment, four tabs 50 extend from a bottom surface 52 of the vent base 36. The tabs 50 are equidistantly spaced around the circular vent base 36, near an outer edge 54 of the vent base 36. Thus, each tab 50 is disposed about 90° from each other tab 50 around the vent base 36. It should be understood, however, that any suitable number of tabs 50 and corresponding slots 34, along with appropriate spacing, could be used. For example, the slots 34 could be oriented at intervals in the range of 15°-45°, or even 90°, apart, by way of example. Each tab 50 has a lip 56 extending from it to lock the tab 50 into a slot 34, which will be described in further detail below.

To install the vent cap 10, it may be desirable to attach the insertion part 16 to the transmission case 14 prior to attaching the vent part 18 to the insertion part 16. For example, the insertion part 16 could be screwed onto the transmission case 14 via the threads 30, and thereafter, the tabs 50 could be inserted into the slots 34 to attach the vent part 18 to the insertion part 16. Before attaching the vent part 18 to the insertion part 16 via the slots 34 and tabs 50, the installer decides where the opening 48 on the hose attachment portion 38 should be oriented to be able to efficiently attach to the hose 15. Accordingly, the installer aligns the opening 48 of the hose attachment portion 38 in the desired direction, and then inserts the tabs 50 into the nearest slots 34 to mate the tabs 50 with the nearest corresponding slots 34. The tabs 50 are snapped into the slots 34, with the lips 56 engaging the edges of the slots 34. Thus, only four of the twelve slots 34 will be occupied by a tab 50, in this embodiment.

Once the tabs 50 are inserted into four of the slots 34, the lips 56 prevent the tabs 50 from escaping the slots 34. When the vent cap 10 is assembled, the insertion part 16 is attached to the vent part 18, and a bottom surface 52 of the vent base 36 of the vent part 18 contacts a top surface 58 of the insertion base 20 of the insertion part 16. The channel 24 formed in the insertion part 16 communicates with the channel 40 formed in the vent part 18. The first portion 42 of the channel 40 formed in the vent part 18 is oriented substantially parallel with the channel 24 formed in the insertion part 16, and the second portion 46 of the channel 40 formed in the vent part 18 is oriented substantially perpendicular to the channel 24 formed in the insertion part 16.

A nub 60 may extend from the bottom surface 52 of the vent base portion 36, which is inserted into the channel 24 of the of the insertion part 16 when the vent part 18 is attached to the insertion part 16. An O-ring 62 may be disposed around the nub 60 to seal the insertion part 16 to the vent part 18. The opening 44 of the first portion 42 of the channel 40 may be formed through the nub 60, as illustrated.

The hose attachment portion 38 is unitarily formed with a knob portion, which may aid the installer in handling the vent part 18 and fixing the vent part 18 to the insertion part 16 and the transmission case 14. The vent cap 10 is preferably formed of a plastic material, such as nylon.

In the alternative to the slots 34 and tabs 50, other attachment features may be utilized to attach the vent part 18 to the insertion part 16. In one variation, the insertion part 16 could have tabs 50 disposed thereon, instead of slots 34, and the vent part 18 could have slots 34 disposed on its base 36 instead of tabs 50. In another alternative, the vent part 18 could have both tabs 50 and slots 34 disposed thereon, and the insertion part 16 could have both tabs 50 and slots 34 disposed thereon. In yet another alternative, the vent part 18 and the insertion part 16 could be welded together, or the vent part 18 and the insertion part 16 could be unitarily formed as one piece by, for example, injection molding.

The description of the invention is merely exemplary in nature and variations that do not depart from the gist of the invention are intended to be within the scope of the invention. Such variations are not to be regarded as a departure from the spirit and scope of the invention.

What is claimed is:

1. A two part transmission vent cap, the vent cap comprising:

an insertion part for attaching the vent cap to a transmission, the insertion part having a flat circular insertion base, a pair of opposed tabs extending radially from said flat circular insertion base, at least one insertion base attachment feature, a cylindrical projection defining an axis and having threads adapted to be received within an opening of the transmission and a first channel disposed about the axis and extending through the insertion part; and a vent part attached to the insertion part, the vent part having a flat circular vent base, at least one vent base attachment feature and a hose attachment portion extending from the flat circular vent base adapted to receive a vent hose, the vent part defining a second channel therethrough, the second channel communicating with the first channel and defining a first portion disposed about the axis and a second portion oriented substantially perpendicular to the first portion, wherein the at least one insertion base attachment feature and the at least one vent base attachment feature are capable of locking the vent part to the insertion part in at least three different orientations, wherein at least one of the vent base and the insertion base has at least three vent base attachment features or insertion base attachment features, wherein each of the insertion base attachment features and each of the vent base attachment features are one of a tab having a lip and a slot defining a through opening, wherein the lips prevent the tabs from escaping the slots.

2. The vent cap of claim 1, wherein the at least one insertion base attachment feature comprises twelve slots formed in the insertion base, and wherein the at least one vent base attachment feature comprises four tabs, wherein the four tabs are inserted into four of the twelve slots of the insertion base to attach the vent part to the insertion part.

3. The vent cap of claim 1, the insertion part having an inner surface defining the first channel therethrough, the vent part further comprising a nub extending from the vent base and configured to mate with the inner edge of the of the insertion part, the nub forming part of the second channel.

4. The vent cap of claim 1, further including a nub extending from the vent part and disposed along the axis, a circumferential groove disposed about the nub and an O-ring seal disposed in the circumferential groove.

5. A transmission vent cap, the vent cap comprising:
an insertion part for attaching the vent cap to the transmission, the insertion part having a flat circular insertion base, a pair of opposed tabs extending radially from said flat circular insertion base, a plurality of insertion part attachment features formed on the insertion base and a cylindrical projection defining an axis and having an inner surface defining a first channel disposed about the axis and extending through the insertion part; and a vent part for attaching the vent cap to a hose, the vent part being attached to the insertion part, the vent part having a flat circular vent base, a plurality of vent base attachment features and a hose attachment portion extending from the flat circular vent base, the vent part including a projecting nub, the vent part and the nub defining a second channel therethrough, the second channel communicating with the first channel and defining a first portion disposed about the axis and a second portion being oriented substantially perpendicular to the first portion, wherein each of the insertion part attachment features is a slot that defines a through opening and each of the vent part attachment features is a tab with a lip that prevents the tabs from escaping the slots, wherein each vent part attachment feature is configured to self-lock with a press-fit into an insertion part attachment feature of the plurality of insertion part attachment features in at least three different orientations, wherein the inner edge extends through the cylindrical projection, the first channel is formed through the cylindrical projection and the insertion base, and the flat circular insertion base has an insertion base surface.

6. The vent cap of claim 5, wherein the cylindrical projection has a threaded outer surface for attaching the insertion part to a transmission case.

7. The vent cap of claim 6, wherein the vent base has a vent base surface, the plurality of vent part attachment features being disposed on the vent base surface, the vent base surface contacting the insertion base surface.

8. The vent cap of claim 7, the projection having an inner cylindrical edge defining the first channel therethrough.

9. The vent cap of claim 5, further including a circumferential groove disposed about the projecting nub and an O-ring seal disposed in the circumferential groove.

10. A two part transmission vent cap assembly, the vent cap assembly comprising:
an insertion part for attaching the vent cap assembly to a transmission, the insertion part having a flat circular insertion base, a pair of opposed tabs extending radially from said flat circular insertion base, a cylindrical projection extending from the insertion base, the cylindrical projection defining an axis, and including a threaded surface for attachment to a transmission case, a first channel disposed on the axis and extending through the base and having the projection of the insertion part, the insertion part having at least one of a locking tab having a lip and a mating slot defining a through opening formed unitarily with the flat circular insertion base; and a vent part for attaching the vent cap assembly to a hose, the vent part having a flat circular vent base and a hose attachment portion extending from the vent base, the vent part defining a second channel therethrough, the second channel being in communication with the first channel when the vent part and the insertion part are attached together, the second channel having a first portion disposed about the axis and a second portion in the hose attachment portion oriented substantially perpendicular to the axis, the vent part having at least one of a locking tab having a lip and a mating slot defining a through opening formed unitarily with the flat circular vent base, wherein the locking tabs and mating slots are capable of locking the vent part to the insertion part in at least three orientations and the locking tab lips prevent the locking tabs from escaping the slots.

11. The vent cap assembly of claim 10, wherein the insertion part has the at least three mating slots formed therein, the at least three mating slots comprising twelve mating slots, and wherein the vent part has four locking tabs extending therefrom, the four locking tabs being disposed in four of the twelve mating slots to attach the vent part to the insertion part.

12. The vent cap assembly of claim 11, wherein the first channel is formed through the projection and the insertion base, the insertion base has an insertion base surface, the twelve mating slots are formed in the insertion base surface, the vent base has a vent base surface that contacts the insertion base surface, and the locking tabs extend from the vent base surface, each locking tab extending through a mating slot of the twelve mating slots.

13. The vent cap assembly of claim 10, the insertion part having an inner surface defining the first channel therethrough, the vent part further comprising a nub extending from the vent part and configured to mate with the inner edge of the of the insertion part, the nub forming part of the second channel and including a circumferential groove disposed thereabout and an O-ring seal disposed in the circumferential groove.

\* \* \* \* \*